Nov. 18, 1947.  W. H. LEHMBERG  2,430,881
GOGGLES
Filed Dec. 29, 1941   2 Sheets-Sheet 1
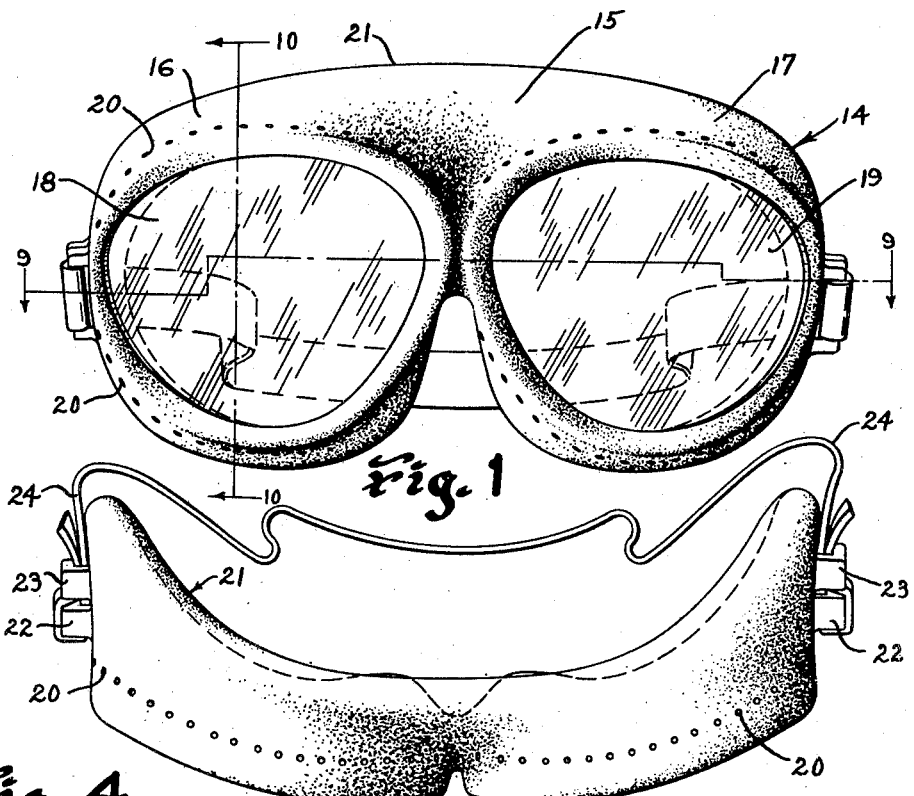
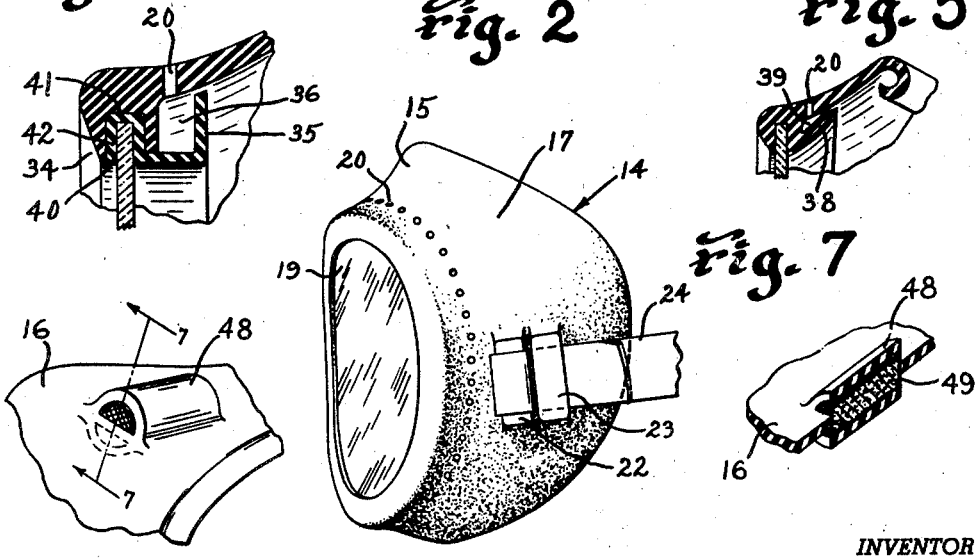
INVENTOR
WILLIAM H. LEHMBERG
BY Louis L. Gagnon
ATTORNEY Nov. 18, 1947.  W. H. LEHMBERG  2,430,881
GOGGLES
Filed Dec. 29, 1941  2 Sheets-Sheet 2
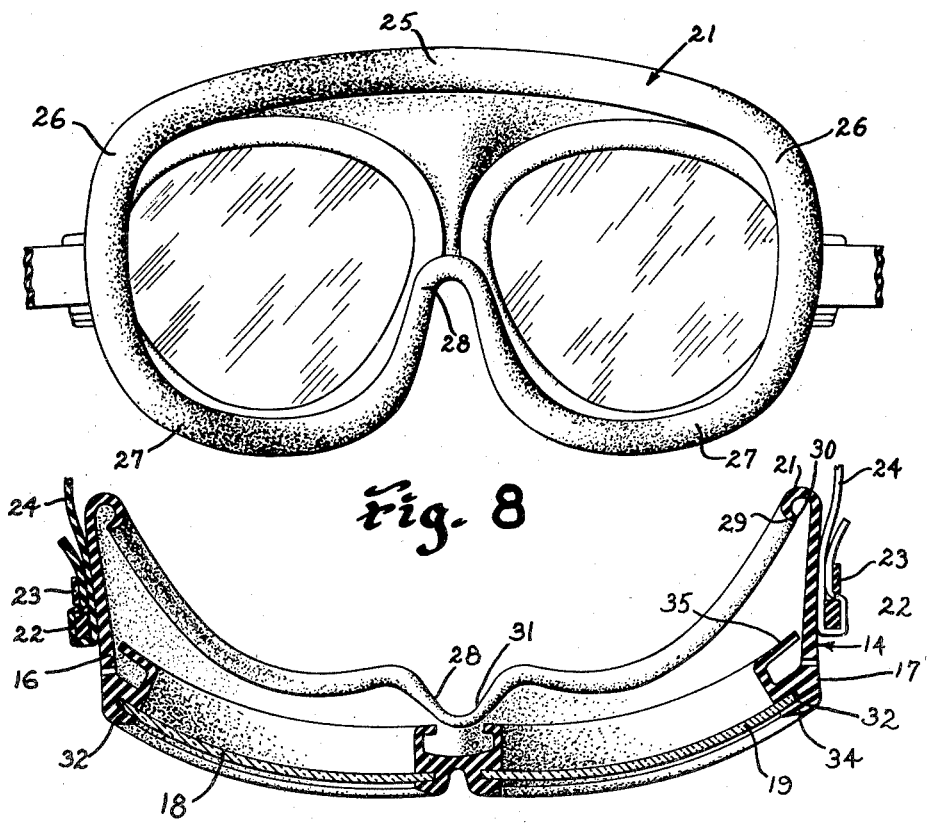
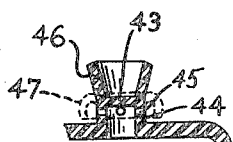
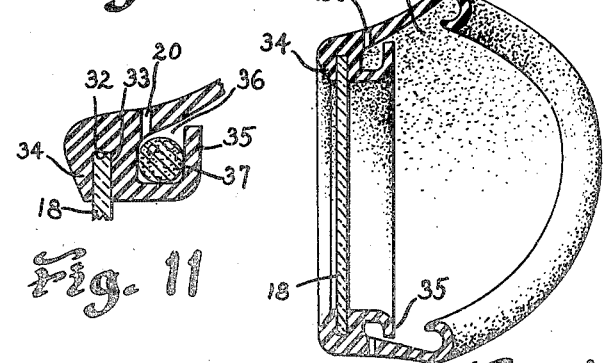
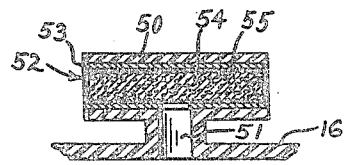
INVENTOR
WILLIAM H. LEHMBERG
BY
ATTORNEY Patented Nov. 18, 1947

2,430,881

UNITED STATES PATENT OFFICE 2,430,881

GOGGLES

William H. Lehmberg, Dudley, Mass., assignor to American Optical Company, Southbridge, Mass., a voluntary association of Massachusetts Application December 29, 1941, Serial No. 424,712

15 Claims. (Cl. 2—14)

This invention pertains to goggles, and more particularly to a face mask type of goggle which is made out of pliable material such as rubber.

The present invention contemplates a goggle made of pliable material such as rubber so that a face mask goggle may be made having the contacting face portion of resilient material so that the material will yield when the goggle is suitably placed on the face of a wearer to provide a completely face form fitting goggle. This is quite essential since the goggle may be used in the presence of any liquid or gas which possesses the properties of causing irritation to the conjunctival member of the eye which may result in tearing or otherwise causing irritation or injury as a result of exposure to the potentially injurious gas or liquid.

The present invention provides a form fitting face mask goggle adapted to snugly fit the face in the area surrounding both of the eyes to prevent injury to the human eyes by preventing undue exposure of the eye to the presence of injurious gases or liquids.

It is a further object of the invention to provide a form fitting face mask goggle with means for ventilating the goggle to prevent fogging and to filter the air drawn into the goggle and restrict or prevent the injurious gas or liquid from entering the eye cup when the goggle is in use.

It is a further object of the invention to provide a novel means for neutralizing or destroying the harmful effectiveness of the gas or liquid as the air is drawn into the goggle for ventilating the eye cups.

A further object of the invention is to provide novel head band adjustment and attachment means, which adjustment and attachment means are preferably made of acid resisting material.

It is a further object of the invention to provide novel lens retaining means used in conjunction with a goggle preferably of the form fitting face mask type.

Other and further objects may be and may become apparent to one skilled in the art from a perusal of the drawings and specification presented herewith. It is to be understood that the invention is not limited to the specific disclosure presented herein as changes and alterations may be made as equivalents within the spirit of the invention as defined by the subjoined claims.

In the drawings:

Fig. 1 is a front view of a form fitting face mask goggle.

Fig. 2 is a plan view of Fig. 1.

Fig. 3 is a side view of Fig. 2.

Fig. 4 is an enlarged sectional view partly broken away showing a modification of the lens retaining means in relation to the eye cup.

Fig. 5 is a modification of Fig. 4.

Fig. 6 is a partial perspective view of a cartridge type filter member.

Fig. 7 is a sectional view taken along lines 7—7 of Fig. 6.

Fig. 8 is a rear view of Fig. 1 to show the contour edges of the face contacting portion of the goggle.

Fig. 9 is a sectional view taken along lines 9—9 of Fig. 1 to show a sectional view of the goggle and the head adjustment and attachment lugs.

Fig. 10 is a sectional view of the goggle taken along lines 10—10 of Fig. 1.

Fig. 11 is a modification of Fig. 4 showing a wick or neutralizing cartridge for absorption and/or neutralizing of the condensate or liquid within the goggle.

Fig. 12 is a modified form of ventilating means.

Fig. 13 is a filter means disposable exteriorly of the goggle for filtering the air which flows into the eye cup.

Referring to the drawings and more particularly to Figs. 1, 2, and 3, a form fitting face mask goggle 14 is shown having a main body 15 consisting of two eye cups 16 and 17 with lenses 18 and 19 located in the forward part of the eye cups. A series of apertures 20 are located in each of the eye cups behind the lenses and are used for ventilating the eye cups to prevent frosting on the lens. The ventilating of the eye cups is accomplished by the natural flow of convection currents entering through the lower ports or apertures 20 and moved upwardly within the eye cup to naturally flow through the upper or higher ports so that the egress and ingress of air will absorb the moisture within the body of the goggle and prevent said moisture from forming on the inner surface of the lens. The form fitting feature of the face mask goggle is obtained by utilizing a body portion of resilient material with a face contacting portion 21 on the rear of the goggle, said face contacting portion being shaped to substantially follow, in a continuous line, the contours of the face of a wearer in the area of the eyes so that under natural conditions there will be a sealed edge formed between the face contacting portion 21 of the goggle and the face of the wearer. The lenses of the goggle are curved rearwardly from the nasal sides of the lenses to the temple sides of the lenses to permit a wide range of vision. The size and shape of the lenses may be varied so that the lens receiving portion of the goggle may be varied in angle, size and shape to permit the goggle to be somewhat varied in manufacture to lend adaptability for the particular type of service to which the face mask goggle may be applied.

Head band adjustment and attachment lugs 22 and 23 secure a head band 24 to the side areas of the goggle 14 to permit the face contacting portion 21 of the goggle 14 to be suitably drawn against the face of a wearer in order to obtain the proper seal between the face contacting portion 21 and the various face portions of an individual in a continuous unbroken line.

Referring to Figs. 8, 9, and 10, the face contacting portion 21 consists of a brow portion 25, temple portions 26, cheek portions 27 and a nasal portion 28. The face contacting portion has the brow portion 25 extending across both of the brows, while temple portions extend substantially vertically and merge with the brow portion 25 and cheek portions 27. The cheek portions are located on the bottom part of the goggle body 15 on each of the eye cups, with the inner areas of the cheek portions 27 merging with a nasal portion 28. While the brow, temple, cheek, and nasal portions have been referred to specifically, it will be seen that all of said portions blend or merge with their adjacent portions so that the face contacting portion 21 is a continuous surface for engaging the face of the wearer completely surrounding both of the eyes. The nasal portion 28 or bridge portion of the goggle engages the upper portion or bridge of the nose and extends downwardly and rearwardly. The cheek portions on either side of the nasal portion of the goggle extend laterally outwardly and are slightly cupped forwardly to follow the general contours of the cheek portions of the face. The cheek portions of the goggle then extend rearwardly and upwardly to merge with the temple portions of the goggle, while the temple portions extend upwardly and inwardly to merge with the curved brow portion, which brow portion extends forwardly from the temple portions to form a natural curve following the general outline of a substantially average brow.

The face contacting portion 21, as shown in Figs. 9 and 10, is formed of a resilient material, such as rubber, and extends rearwardly from the body portion of the goggle in a general curve that sweeps inwardly and then outwardly with the inner peripheral edge 30 of the face contacting portion terminating in spaced relation to the inner surface of the side walls of the body of the goggle. The inwardly turned lip 29 terminates with the peripheral edge 30 extending completely around the face contacting portion 21 in a continuous loop. In order to permit maximum range of visibility about the nasal area of the goggle, the lip 29 is reduced in cross sectional size about the nasal area 31 of the nasal portion 28. The nasal area 31 may be considered to embrace substantially the area which is contacted by the nasal portion 28 of the face contacting member. The face contacting portion 21, being made of resilient material, has a wide range of adaptability in that the resiliency of the material itself is used by depression against the face of the wearer, but the inwardly turned lip 29 may yield since the inner peripheral edge 30 of the lip 29 is spaced from the side walls of the body 15 which permits movement of the lip inwardly to provide maximum movement of the lip when the goggle is drawn into position on the face of an average person.

The head band adjustment and attachment lugs 22 and 23 are each formed of a piece of resilient material, such as rubber, and each has a recess therein to permit the head band 24 to be threaded through said recesses for attaching the head band and adjustably locating same. The recess in each of the lugs 22 and 23 causes the said lugs to have outer strap-like portions in spaced relation to the sides of the body 15 so that the head strap may pass through said recesses in the respective lugs and then be folded back about the strap portion of the lug 22 and then be extended back through the recess in the lug 23 beneath the strap portion of said lug. The securing of the lugs to the body 15 may be done by cementing or vulcanizing, or may be molded thereon when the body 15 of the goggle is fabricated. The lugs 22 each have a recess deep enough to permit the head band 24 to slide therethrough, while the recess in each of the lugs 23 may be deep enough to permit two layers of the head band 24 to slide therethrough as is clearly shown in Figs. 2 and 9. While the lugs 22 and 23 are shown slightly spaced from each other, it is to be understood that they may be spaced close to each other so that it will be necessary to bend the side portion of the goggle body 15 so that the outer portions of the lugs will be spaced from each other to enable the head band 24 to be threaded through the recesses in the lugs 22 and 23. Since the lugs 22 and 23 are preferably made of rubber, the locking action between the head band 24 and the lugs not only results from the arrangement of parts, but also from the inherent characteristics of the materials themselves which tend to deform when the device is in use so that the contacting surfaces of the head band and the lugs tend to depress and deform each other so that an unusual gripping and locking action results between the lugs and the head band.

The goggle 14 has each of the lenses 18 and 19 held in place by a recess 32, with each of said recesses being formed in the forward part of each of the eye cups 16 and 17, with each of said recesses forming a complete channel about its respective eye cup on the inside thereof for receiving the lens. The recess 32 forms a channel of sufficient depth and width to permit the lens to be substantially sealed therein with the inner surfaces of the channel securely engaging the peripheral edge areas of the lens. The lenses may be placed in their respective channels by distorting the rubber of the channel until the lenses fit into the channel, at which time the distortion of the channel is removed and the lens is properly positioned in its channel.

An enlarged section of the lens retaining channel or recess 32 is shown in Fig. 11 wherein the lens 18 engages the channel 32 with a portion of the rear of the lens 18 engaging a shoulder 33 while a front portion of the lens 18 is engaged by a lip portion 34, the inner surface of which forms one side of the channel or recess 32.

Throughout certain of the various views particularly including Figs. 1 to 5, there is shown ventilating holes 20 which penetrate the body 15 so that a series of ports extends from the exterior of the respective eye cups to the interior thereof. Natural convection currents may be taken advantage of in a well known manner so that fogging of the lenses may be reduced to a minimum or entirely eliminated. It will be noted in Figs. 4, 5, 9, 10, and 11 that the inward termination of the ventilating holes or ports 20 is located behind a baffle 35 which forms an annular substantially closed channel 36 so that any liquid, such as an acid, which may seep into the holes 20 will have a tendency to remain within the channel 36 to be absorbed by a wick such as 37. The channel also permits the flow of convection air current to be somewhat guided in its path of flow to assist in increasing and maintaining adequate ventilation within the eye cups.

Fig. 4 shows the baffle 35 being at substantially right angles to the side walls of the eye cups 16 and 17, while the baffle 38 shown in Fig. 5 is somewhat parallel with the side wall of the eye cup. The channel 39 formed by the baffle 38 in the side wall of the eye cup is somewhat reduced in cross sectional area since this type may or may not have a wick for absorbing the liquid which might seep into the eye cup or form therein by condensation.

The wick 37, shown in Fig. 11, may be chemically treated, or may be formed of any suitable material so that neutralization of the moisture within the goggle may take place to restrict or prevent the eyes from being unduly exposed to the effect of the fumes from the moisture. The wick 37 may extend all the way around the channel 36 or may only be located on the bottom part of the channel, or on the bottom and side parts of the channel depending upon the particular requirements of the goggle.

Fig. 4 is a modified view of a portion of the eye cup showing the insert 40 which is a substantially S-shaped member which is adapted to fit into the recess 41, which recess is of sufficient dimension to receive the lens retaining portion 42 of the insert 40 while the inner portion of the insert 40 extends rearwardly to form the channel 36 by means of the baffle 35. The insert 40 may be made of soft or semi-hard rubber but in any condition must be able to receive the lens and adequately seal same about the peripheral area of the lens so that the lip 34 may be bent back to receive the insert 40. While the insert 40 has been set forth as being an S-shaped member, it is to be understood that it may be of any cross sectional shape so long as it will adequately hold the lens in position when the lens retaining insert is snapped into the goggle and may or may not have the rearward baffle thereon as the case may require.

The rearward baffle may not be used in certain specific goggles manufactured within the spirit of the present disclosure. An example where the baffle may not be used is in a goggle where the ventilation within the eye cups does not result from the passage of an aeriform fluid through the ports such as 20. In this instance, the ports would be non-existent and other ventilating means may be utilized, or ventilating means may not be employed at all. While the various views of the goggles shown herein specifically set forth, in most instances, ventilating ports 20, it is definitely pointed out that this particular type of ventilation may not always be expedient as goggles manufactured within the spirit of the invention may not require this particular type of ventilation, if any.

Another type of ventilation means is shown in Fig. 12 wherein a cap of rubber 43 has side walls 44 with ventilating apertures 45 located below the cap so that the air may flow therethrough from the exterior to the interior of the goggle. A collar 46 is located on an upward portion of the cap 43 so that the collar may be bent downwardly as shown at 47 to extend over the ventilating apertures 45 in spaced relation therewith and in such a position that there is an opening between the peripheral edges of the collar 46. By this arrangement, the air can circulate beneath the downwardly rolled collar 46 and through the ventilating apertures 45 while the apertures are protected from any direct splashing of liquid which might have a tendency to seep or be driven through the apertures 45. The collar 46, when turned downwardly, as shown at 47, acts as a baffle in much the same manner as the baffle 35 of Fig. 11.

In Fig. 12, the collar 46 forms a baffle exteriorly of the goggle while the baffle 35 shown in Fig. 11 is located on the interior of the goggle. The cap 43 may be located on the sides or top portion of the goggle, or may be located anywhere on the goggle so long as it suitably performs the function for which it was intended.

Figs. 6, 7, and 13 show a modification of the canister or cartridge type of ventilating means wherein the air which flows into the goggle is filtered for suitably neutralizing the acid fumes before they flow into the interior of the goggle eye cups.

Figs. 6 and 7 show a portion of the eye cup 16 which has a cylindrical open-ended shell 48 made of rubber, which shell is molded so that a portion of the open-ended area thereof is located within the eye cup and a portion thereof is located outside of the eye cup. By deforming the eye cup and the shell a cartridge 49 may be slipped within the shell rather snugly so that a portion of the open ends of the cartridge will be exposed on the inside as well as on the outside of the eye cup.

Fig. 13 is a modification of Figs. 6 and 7 and shows a sectional view having an elongated shell 50 which communicates through a port 51 through the interior of the eye cup 16. A cartridge 52 has an outer housing 53 which is open at either end thereof and an acid neutralizing filler 54 may be completely enclosed within a wire mesh 55. The filler in the cartridge used in Figs. 6, 7, and 13 may consist of charcoal and soda-lime or any other suitable gas absorbent or neutralizing material.

In the various views shown concerning the wick in Fig. 11 and the cartridges in Figs. 6, 7, and 13, it is not intended that the particular gas absorbent or neutralizing materials be a limitation since any suitable material may be used depending upon the particular function of the goggle and the desired results.

The ventilation apertures used for the cartridges as shown in Figs. 6, 7, and 13 are particularly intended for use in a goggle that is face form fitting and does not utilize the series of ventilating ports or apertures 20 as set forth in Figs. 1, 2, and 3. In this type of goggle there is very slight if any natural convection currents flowing from the interior to the exterior of the goggle. In this case, the circulation of air is by forced ventilation which is obtained while the goggle is in use. In practice, the forced ventilation is used when the wearer of the goggle notices that the lens are beginning to fog or cloud. When this condition is observed, the wearer merely compresses the eye cups toward the eyes so that certain of the air within the eye cup will be forced outwardly through the cartridge. As soon as the pressure is released after compressing the goggle toward the eyes of an individual, the natural restoration to normal form of the deformed eye cups will result in the air being filtered through the cartridge, which cartridge neutralizes and filters the air before it is drawn within the eye cups of the goggle.

While there has been specific reference to the eye cups of the goggle, it will be observed that the eye cups communicate with each other between the nasal and brow portions of the goggle so that the entire area of both of the interiors of the eye cups form a unitary ventilating field in contradistinction to having a separate sealed eye cup for each of the eyes.

While reference has been made to a single cartridge in many instances, it is to be understood that one or more cartridges may be used for each of the eye cups depending upon the characteristics of the filter and the extent of the required ventilation.

Having described my invention, I claim:

1. A face mask goggle of the class described comprising a pair of resilient eye cups, each eye cup having a plurality of ventilating ports extending through the wall of the eye cup and an annular retaining groove therein, a lens located in each of said annular retaining grooves in the eye cups, said ventilating ports communicating with the interior of the eye cups in the rear of the annular retaining grooves and annular baffles in the eye cups in the rear of the lenses and of a shape which forms a continuous channel within each of the eye cups in the rear of the lenses and communicating with the inner openings of the ventilating ports.

2. A face mask goggle of the class described comprising a pair of resilient eye cups, each eye cup having a plurality of ventilating ports extending through the wall of the eye cup and an annular retaining groove therein, a lens located in each of said annular retaining grooves in the eye cups, said ventilating ports communicating with the interior of the eye cups in the rear of the annular retaining grooves, and annular baffles in the eye cups in the rear of the lenses and of a shape which forms a continuous channel within each of the eye cups in the rear of the lenses, the free inner peripheral edges of said baffles being spaced from the adjacent walls of the eye cups with the channel communicating with the inner openings of the ventilating ports.

3. A face mask goggle of the class described comprising a pair of resilient eye cups, each eye cup having a plurality of ventilating ports extending through the wall of the eye cup and an annular retaining groove therein, a lens located in each of said annular retaining grooves in the eye cups, said ventilating ports communicating with the interior of the eye cups in the rear of the annular retaining grooves, annular baffles in the eye cups in the rear of the lenses of a shape to form a continuous channel within each of the eye cups in the rear of the lenses, said baffle formed channel communicating with the inner openings of the ventilating ports, and a wick of liquid absorbing material located in the baffle formed channel.

4. A device of the character described comprising a unitary cup-like member of resilient material having a pair of spaced openings therein, said openings being surrounded by integral channelled portions for receiving lenses, said cup-like member having continuous uninterrupted integral walls extending rearwardly from the channelled portions to a continuous face engaging edge portion shaped to the general contour shape of the face throughout the width of the brow, the outer temporal sides of the face, cheeks and the nasal portion with the walls on the temporal sides extending rearwardly from adjacent the lens receiving channels on the temporal sides thereof in substantially parallel relation with each other, with said preformed face engaging edge being at a distance from the channelled portions sufficient to form a unitary hollow chamber about the two eyes and said preformed face engaging edge portion having a continuous integral inwardly curled lip with a free edge spaced from the inner walls of the cup-like member whereby said inwardly curled lip will be free to yield in a sidewise direction to compensate for slight departures of the facial contour of a particular individual from the general contour shape to which the face engaging edge portion of the cup-like member is initially formed, said cup-like member having a plurality of spaced ventilation openings extending through the wall thereof adjacent to and in the rear of the lens receiving channels and baffle means internally of the cup-like member overlying the inner ends of the ventilation openings and spaced from the adjacent wall having said ventilation opening therein.

5. A face mask goggle of the class described comprising a unitary face piece having a nasal recess in the lower edge thereof and a plurality of ventilating ports extending through the wall of the face piece, a face contacting portion, and spaced openings having lens receiving channel portions surrounding the openings, said face piece constituting in part a unitary cup-like member having its lens receiving channelled portions spaced from its face contacting portion an amount sufficient to provide a continuous air chamber between said face contacting portion and said lens receiving channels when in position of use on the face, said face contacting portion having a unitary inwardly curled lip adjacent the inner peripheral edge of the body portion, said curled lip being continuous throughout the peripheral edge and having a side surface contact with the face of a wearer about the brow, temples, cheeks, and nasal portion of the face, said lens receiving channel portions adapted to receive a pair of lenses therein, a pair of lenses located in said channels, and means secured to the face mask for positionally retaining same on the face of a wearer.

6. A face mask goggle of the class described comprising a pair of lenses, a unitary face piece of resilient material forming a pair of eye cup portions having a nasal recess in the lower edge thereof intermediate the eye cup portions and having a plurality of spaced ventilating ports extending through the wall of the face piece adjacent the eye cup portions to restrict fogging of the lenses when the face mask goggle is in use, a face contacting portion, and spaced lens receiving channel portions in said eye cups, said face piece constituting in part a unitary cup-like member having its lens receiving channelled portions spaced from its face contacting portion an amount sufficient to provide a continuous air chamber between said face contacting portion and said lens receiving channels when in position of use on the face, said face contacting portion having an integral unitary inwardly curled lip adjacent the inner peripheral edge of the face piece, said curled lip having side surface contact with the face and being continuous and encompassing both of the orbital rims of the face adjacent the eyes and overlying the bridge of the nose, said lenses being located in said channels with the ventilating ports lying in the rear thereof and resilient attachment means on the sides of the face mask for adjustably receiving a head band.

7. A face mask goggle of the class described formed essentially of resilient material comprising a pair of eye cups, a lens disposed in each of said eye cups, a tubular-like portion having an opening extending through the wall of the goggle with one side of the tube lying below and the other above the plane of the wall of the goggle to provide a communicating port between the interior and exterior of the goggle, and a chemical neutralizing cartridge disposed in said tubular like opening with one side portion lying above the plane of the wall and an opposed side portion lying below and inwardly of the plane of the wall.

8. In a device of the character described embodying lens holding means, a pair of spaced perforated resilient lugs in adjacent relation with each other on the sides of the lens holding means and a headband having a portion threadedly connected with said resilient lugs in such a manner that tension strain on said headband will cause one of said lugs to be distorted in a direction towards the other.

9. In a device of the character described embodying a pair of eye cup portions, a pair of spaced perforated resilient lugs on the sides of said eye cup portions, said lugs being in adjacent relation with each other and a headband member having a portion extending through the perforations of the respective lugs about the end of one of said lugs and back through the perforation in the other of said lugs whereby tension pull on said headband will cause one of said lugs to be distorted in a direction towards the other of said lugs.

10. In a device of the character described a face mask type goggle comprising a unitary cup-like member shaped to surround both of the eyes of an individual and formed essentially of resilient material having a pair of lens receiving openings and a face engaging edge portion inherently shaped substantially to the contour of the face about the eyes and having a nasal recess adapted to receive the nose, said facepiece having a plurality of ventilation ports extending through the walls thereof in the rear of the lens receiving openings, baffle means internally of the cup-like member and extending about the lens receiving openings and forming channel-like means communicating with the ventilation ports, the opposed temporal sides of the face mask type goggle being provided with a pair of perforated lugs in adjacent relation with each other and headband means threadedly connected with said lugs in such a manner that tension pull on said headband will cause one of said lugs to move in a direction towards the other.

11. In a device of the character described embodying a unitary face piece, a pair of spaced perforated lugs on the sides of said face piece, said lugs being in adjacent relation with each other with at least one of said lugs resiliently supported for movement toward the other of said lugs and a head band member having a portion extending through the perforations of the respective lugs, about the end of one of said lugs and back through the perforation in the other of said lugs whereby tension pull on said head band will cause said resilient lug to be distorted in a direction towards the other of said lugs.

12. Goggles comprising a unitary frame of resilient material having an integral lens supporting front portion curved in the direction of the contour of the face and having yieldable channel means therein for supporting lens means whereby the lens may be positioned and held in said channel means by distortion of the walls of said channel means and through the tendency of the material thereof to return to its initial set, said frame having continuous walls extending rearwardly from and at an angle to the portion having the channel means therein and to a continuous integral face engaging portion shaped to the general contour shape of the face throughout the width of the brow, the outer temporal sides of the face, cheeks and the nasal portion, with the walls on the temporal sides extending rearwardly from adjacent the channel means a distance greater than the remaining wall portions, the said walls being so angled relative to the channel means as to space said face engaging edge at a distance from the channel means sufficient to form a continuous hollow chamber transversely of the two eyes between the face engaging edge and channel means when in position of use on the face, said face engaging portion having a continuous integral inwardly curling lip extending throughout the entire face engaging edge portion from adjacent the opposed sides of the nasal portion, with said lip curling inwardly as a continuation of the walls with the outer surface of said walls and lip in substantially flush relation with each other whereby the resilient material of the frame will permit said face engaging portion to assume the general contour shape of the face and with said lip having a free inner edge spaced from the inner walls of the frame whereby said inwardly curved lip will have side surface contact with the face and will be free to yield in a sidewise direction to compensate for slight departures or differences in the facial contour of different individuals to provide a relatively intimate seal with the face when in position of use.

13. A face mask goggle of the class described comprising a pair of resilient eye cups, each eye cup having a plurality of ventilating ports extending through the wall of the eyecup and a groove therein, an annular member located in each of said grooves, said annular members each having a channel for receiving a lens, and baffle means shaped to form a continuous channel within each of the eye cups in the rear of the lenses and communicating with the inner openings of said ventilating ports.

14. A face mask goggle of the class described comprising a pair of eye cups, each eye cup having a plurality of ventilating ports extending through the wall of the eye cup and a groove therein, an annular member located in each of said grooves, said annular members each having a channel for receiving a lens, baffle means shaped to form a continuous channel within each of the eye cups in the rear of the lenses and communicating with the inner openings of said ventilating ports, and a chemical neutralizing material located in each of said channels.

15. A face mask goggle of the class described comprising a unitary facepiece of resilient material having a continuous face engaging edge shaped to fit about the eyes and having a nasal recess in the lower edge thereof and spaced eyecups having openings with lens receiving channels surrounding said openings, said facepiece constituting a unitary cup-like member having its lens receiving channels spaced from the face engaging edge and providing a continuous air chamber between the face engaging edge and said lens receiving channels, a plurality of ventilating ports extending through the wall of the face mask in the rear of the lens receiving channels and an inner lip-like baffle extending rearwardly adjacent the lens receiving channel of each of the eye-cups with the said rearwardly extending lip turning outwardly toward the side walls of the face mask and forming a ventilating channel with which the plurality of ventilating ports communicate.

WILLIAM H. LEHMBERG.

REFERENCES CITED

The following references are of record in the file of this patent:

UNITED STATES PATENTS

| Number | Name | Date |
|---|---|---|
| 843,065 | Black | Feb. 5, 1907 |
| 1,295,391 | Troppman | Feb. 25, 1919 |
| 1,582,785 | Ratti | Apr. 27, 1926 |
| 1,936,746 | Baker | Nov. 28, 1933 |
| 2,084,897 | Dym | June 22, 1937 |
| 1,990,208 | Sager | Feb. 5, 1935 |

FOREIGN PATENTS

| Number | Country | Date |
|---|---|---|
| 773,077 | France | Aug. 25, 1934 |